Figure 5:
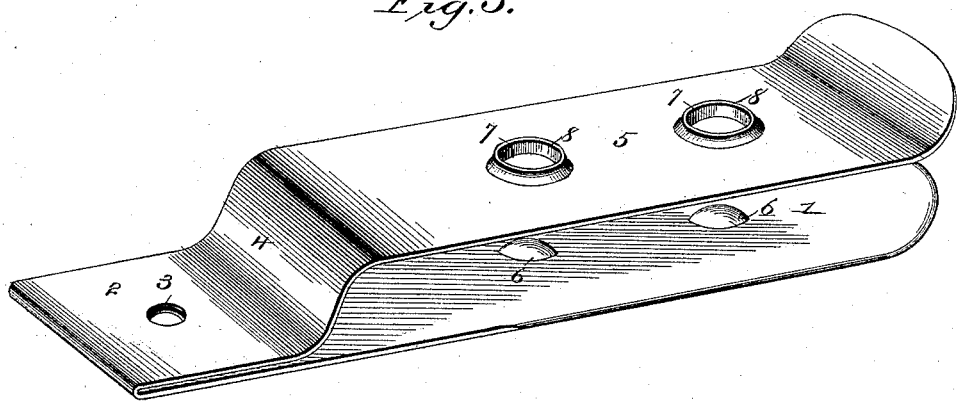

(No Model.) 2 Sheets—Sheet 1.
E. M. ROBERTS.
AIR BRAKE HOSE SUPPORT.
No. 468,693. Patented Feb. 9, 1892.
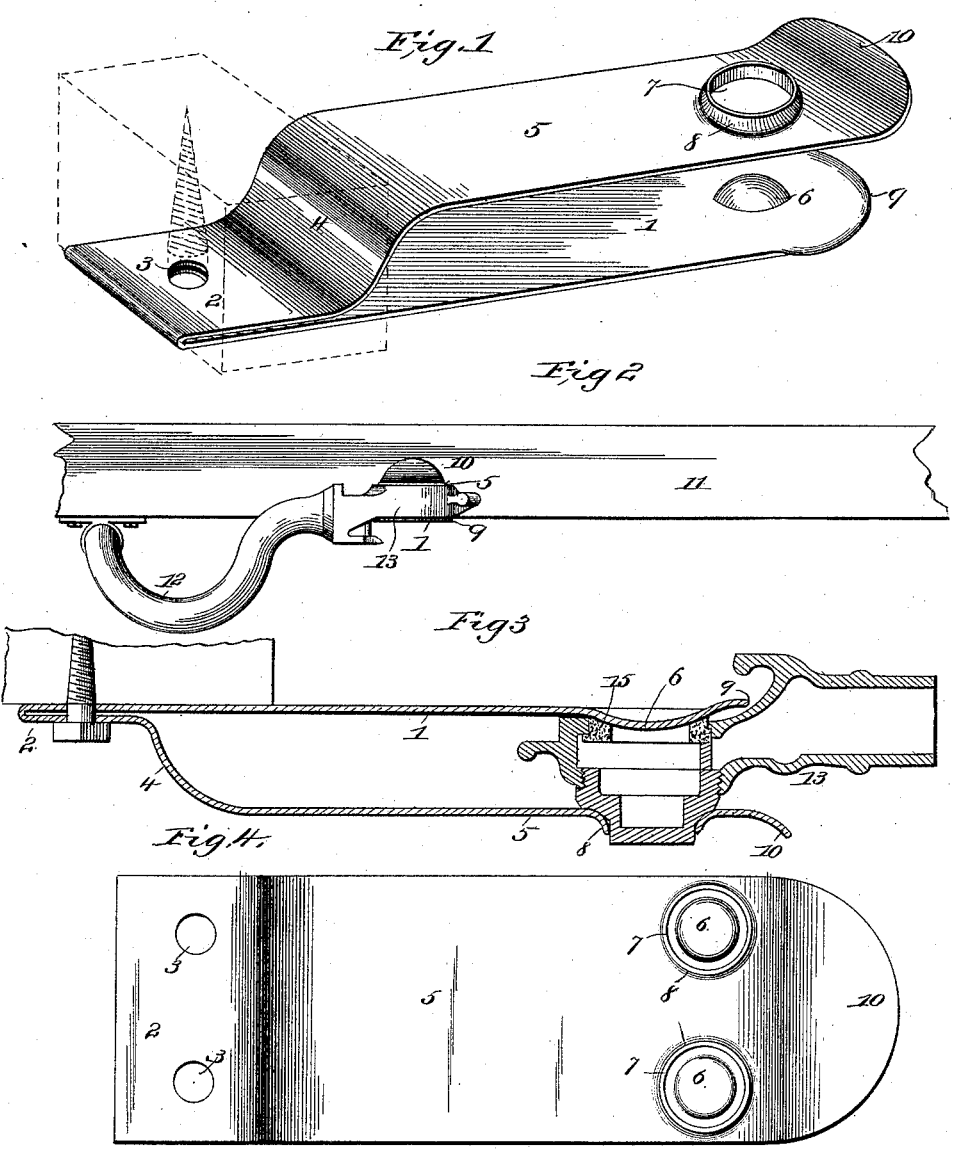
Attest:
Harry B. Rohrer
George E. Cruse
Inventor.
E. M. Roberts
By Knight Bros.
Attys.

(No Model.) 2 Sheets—Sheet 2.
E. M. ROBERTS.
AIR BRAKE HOSE SUPPORT.

No. 468,693. Patented Feb. 9, 1892.

Attest:
Harry D. Rohrer
George E. Cruse

Inventor:
E. M. Roberts
By Knight Bros.
Attys

UNITED STATES PATENT OFFICE.

EDWARD M. ROBERTS, OF CHARLESTON, SOUTH CAROLINA.

AIR-BRAKE HOSE-SUPPORT.

SPECIFICATION forming part of Letters Patent No. 468,693, dated February 9, 1892.

Application filed November 10, 1891. Serial No. 411,479. (No model.)

*To all whom it may concern:*

Be it known that I, EDWARD M. ROBERTS, a citizen of the United States, residing at Charleston, in the county of Charleston and State of South Carolina, have invented certain new and useful Improvements in Air-Brake Hose-Supports, of which the following is a specification.

My invention relates to means for supporting and closing the end of the hose at the end of a railway-car which is used for making air-brake connections between the cars; and my invention has for its object to provide simple and inexpensive means for supporting said connection in a convenient position by engagement with the coupling-head, preventing the wear of the same and excluding dust from its valve, and thus materially increasing the period of duration of the parts.

In carrying out my invention I employ a strip of sheet metal of suitable size, which is bent at or about the middle upon itself to form a lower jaw, and a reinforced end which is perforated for the passage of an attaching-screw, then bent upward to form an offset, then in a direction parallel with the lower jaw or portion of the device, and terminated opposite the end of said lower portion. The jaws thus formed with a space between them are provided the one with a flanged perforation and the other with a hemispherical or convex seat.

In use the connecting end of the hose is inserted between the jaws of the support, the head or nut being passed upward through the flanged opening and the washer resting upon the lower member or portion of the support and surrounding the convex seat. The jaws are so spaced as to press tightly upon the opposite sides of the connecting end inserted between them, and the character of the material used adapts the arms to be spread apart for the insertion of said connecting end of the hose and to grip the same firmly while it is between them, thus forming a dummy-coupling and excluding dirt, dust, grease, or other deleterious matter.

In order that my invention may be fully understood, I will describe the same with reference to the accompanying drawings, in which—

Figure I is a perspective view of my device. Fig. II is an end elevation showing the attachment of the device to a car-sill and the insertion of the connecting end of the hose therein. Fig. III is a section longitudinally of the support and of the inserted connecting end, illustrating the adaptability of the device for the purpose intended. Fig. IV represents a modification in which the support is adapted for the reception of two connecting-heads on a double-pipe connection used between cars. In this form the connecting ends may be inserted endwise. Fig. V is a modification showing a different arrangement of the double support.

In constructing the device the strip of metal is bent to form a jaw 1, doubled upon itself at the end of said jaw 1 to form the reinforced portion 2, and this reinforced portion is perforated at 3 for the reception of a screw or bolt to be used in attaching the device. The strip is then bent upward, as at 4, a sufficient distance to space the jaws, and then bent parallel with the lower jaw 1 to form another jaw 5. Upon the jaw 1 is stamped or otherwise formed a convex or hemispherical seat 6, while directly over said seat in the other jaw 5 is formed a perforation 7, with an upwardly-extending annular flange 8. The outer ends of the respective jaws are bent or curved in opposite directions, as at 9 and 10, to facilitate the insertion of the connecting end between them.

In use the device is attached to any convenient portion of the rear of the car, either in the position shown in Fig. I, or in inverted position, as shown in Fig. III, by the insertion of a screw or bolt through the perforation 3, and the connecting end 13 of the coupling-hose 12 is held between the jaws 1 and 5 by the insertion of the head 14 into the flanged perforation 7 and allowing the washer 15 to rest itself around the convex seat 6. As stated, the jaws are so set as to hold the head securely in this position, and not only will the connecting-hose 12 be greatly saved from wear occasioned by the usual dangling and swinging of the same, but dust and dirt will be kept from the valve in the connection made, and the parts of said valve will last much longer than in ordinary use when unprotected.

The forms shown in Figs. IV and V are intended for use where two pipes and two connecting-hose are used. In the form shown in Fig. IV the connecting ends are inserted endwise, while in the form shown in Fig. V they are both inserted transversely of the holder and overlap each other.

It is not essential that the seat and perforation be made in the particular jaws to which they are shown applied. The perforation can be made in the straight jaw 1 and the seat be formed on the curved jaw 5 without departing from my invention.

It is obvious that my device will operate equally well whether in the horizontal position shown or in the reverse horizontal position or in vertical position.

I am aware that it is not new to construct means for grasping the connecting end and excluding dirt and foreign matter therefrom, and in a measure restricting its swinging motion; but I am not aware that it has before been proposed to construct a support in the manner hereinbefore described and to attach the same rigidly to the end of the car for supporting the connecting end in convenient position and holding the hose rigidly against swinging motion in a position where it will be protected from dirt and injury and be free to swing and adjust itself to a position which will avoid strain to the coupling of hose.

Having thus described my invention, the following is what I claim as new and desire to secure by Letters Patent:

1. The herein-described air-brake hose-support, which consists of a pair of spring-jaws formed of a single piece of sheet metal bent upon itself, as at 2, to form the reinforced connecting end, then upward, as at 4, to form the offset for spacing the jaws, then in a parallel direction to the first portion to form the other jaw, said jaws being provided, respectively, with a convex seat and flanged perforation for the purpose explained, and the ends of said jaws being bent in opposite directions to facilitate the insertion of the part or parts to be held, all substantially as and for the purpose set forth.

2. The herein-described air-brake hose-support, which consists of a pair of spring-jaws 1 and 5, formed of a single piece of sheet metal and provided, respectively, with a raised seat and a flanged opening for engaging opposite sides of the connecting end of the brake-hose coupling, said jaws being bent at their rear ends, so as to form the double or reinforced attaching end and the offset, substantially as and for the purpose set forth.

3. The air-brake hose-support consisting of a pair of integral jaws formed of a single piece of sheet metal bent near the middle to form the reinforced attaching end, and one of the jaws being bent upward to form the offset for spacing the jaws, said jaws being provided near their ends with means for the reception of opposite sides of the coupling of an air-brake hose, in the manner set forth.

4. An air-brake hose-support consisting of a pair of integral spring-jaws formed of a piece of sheet metal bent to form an offset between them and provided, respectively, with a pair of convex seats and a pair of corresponding perforations for the purpose of holding the connecting ends of a pair of air-brake connecting-hose, substantially as and for the purpose set forth.

E. M. ROBERTS.

Witnesses:
D. S. KAMERER,
NATHL. LEVIN,
W. J. GUNNING.